(12) United States Patent
Barrie et al.

(10) Patent No.: US 6,991,405 B2
(45) Date of Patent: Jan. 31, 2006

(54) APPLICATION OF INERT GAS MIXTURES TO PREVENT AND/OR TO CONTROL SULFIDE MINERAL OXIDATION AND THE GENERATION OF ACID ROCK DRAINAGE

(75) Inventors: Howard A. Barrie, Toronto (CA); David A. Orava, Aurora (CA)

(73) Assignee: Terraquest Technologies, Ltd., Ontario (CA)

( * ) Notice: Subject to any disclaimer, the term of this patent is extended or adjusted under 35 U.S.C. 154(b) by 0 days.

(21) Appl. No.: 10/653,113

(22) Filed: Sep. 3, 2003

(65) Prior Publication Data

US 2004/0067107 A1   Apr. 8, 2004

Related U.S. Application Data

(60) Provisional application No. 60/420,092, filed on Sep. 3, 2002.

(51) Int. Cl.
*B09B 1/00* (2006.01)
(52) U.S. Cl. .................... 405/129.25; 588/252
(58) Field of Classification Search .......... 405/129.25, 405/128.1, 129.2, 129.1, 129.45, 129.6, 129.65; 588/249, 252
See application file for complete search history.

(56) References Cited

U.S. PATENT DOCUMENTS

| | | | |
|---|---|---|---|
| 4,518,399 A | 5/1985 | Croskell et al. | |
| 5,795,620 A | 8/1998 | Iwinski et al. | |
| 5,888,022 A | 3/1999 | Green | |
| 5,905,184 A | 5/1999 | Carter | |
| 6,004,069 A | 12/1999 | Sudbury | |
| 6,199,493 B1 * | 3/2001 | Kiss | 110/342 |
| 2001/0032725 A1 | 10/2001 | Harrington | |

FOREIGN PATENT DOCUMENTS

| | | |
|---|---|---|
| DE | 3535328 A | 4/1987 |
| WO | WO 9521708 A | 8/1995 |
| WO | WO 9837167 A | 8/1998 |

OTHER PUBLICATIONS www.uigi.com/nitrogen.html;, undated.*

* cited by examiner

*Primary Examiner*—John Kreck
(74) *Attorney, Agent, or Firm*—Eugene J. A. Gierczak

(57) ABSTRACT

A system, computer program product and method of preventing and controlling sulfide mineral oxidation and generation of acid rock drainage in a mass of sulfidic waste is provided. The mass of sulfidic waste includes a cover. The method involves applying under the cover of an oxygen deficient/non-reactive gas mixture, substantially throughout the mass of sulfidic waste, in a quantity sufficient to create a pressure differential between the inside of the mass of sulfidic waste and the open atmosphere outside and adjacent to the mass of sulfidic waste, such that the oxygen gas concentration inside the mass of sulfidic waste is substantially equal to, or less than, the atmospheric oxygen gas concentration outside and adjacent to the mass of sulfidic waste. The system includes a distribution system and sensors for detecting acid rock drainage conditions of the mass of sulfidic waste, and in response applying an effective amount of oxygen deficient/non-reactive gas mixture. The computer program product consists of a control program for directing a computer to activate the distribution system to prevent and control acid rock drainage in a mass of sulfidic waste in accordance with the method.

31 Claims, 10 Drawing Sheets

APPLICATION OF INERT GAS MIXTURES TO PREVENT AND/OR TO CONTROL SULFIDE MINERAL OXIDATION AND THE GENERATION OF ACID ROCK DRAINAGE

This application claims the benefit of Provisional 60/420,092 filed Sep. 3, 2002

FIELD OF THE INVENTION

This invention relates generally to the prevention and/or control of sulfide mineral oxidation and generation of acid rock drainage in waste materials prone to sulfide oxidation. This invention relates more particularly to the application of oxygen deficient/inert gas mixtures ("IGM" or "IGMs") in order to prevent and/or control the influx of oxygen from the atmosphere to the waste materials.

BACKGROUND OF THE INVENTION

Acid rock drainage ("ARD") is generated by either natural events or a combination of human activity and natural events and is widely known as an important environmental problem. ARD is the product formed by the oxidation of such commonly found iron-sulfide minerals as pyrite ($FeS_2$) and pyrrhotite ($FeS$). Human activities, such as mining and other rock excavation activities, or disposal of waste, may promote the generation of ARD by increasing the quantity of sulfides exposed to atmospheric elements, thereby increasing the sulfide oxidation process.

While the general characteristics of ARD may vary, ARD is typically acidic with elevated sulfate and dissolved metal concentrations. The consequence of ARD is that any area that is covered by sulfuric materials and wastes, including waste rock, tailings management areas, sulfide concentrate dumps and excavated mine openings and heap leach piles can adversely affect downstream ecology by decreasing the quality of receiving ground and surface waters. This is because water that infiltrates sulfidic materials in which sulfide minerals have oxidized may become acidic and contaminated with elevated concentrations of sulfate and dissolved metals including iron, copper, zinc, and others. The contaminated drainage water is commonly referred to as ARD, acid mine drainage (AMD), and acidic drainage (AD).

The sulfide oxidation process can be generally represented by oxidation of pyrite ($FeS_2$), a common iron sulfide mineral. The following equations describe the oxidation process for pyrite. Equation 1 shows that pyrite oxidation in the presence of sufficient quantities of oxygen and water produces sulfate, ferrous iron, and acidity (H+). As shown in equation 2, the ferrous iron (a reaction product in Equation 1) may oxidize to form ferric iron. Equation 2 can be catalyzed by bacteria (such as *Thiobacillus ferrooxidans*) under low pH conditions. As shown by equation 3, the ferric iron may then hydrolyze to form ferric hydroxide and acidity.

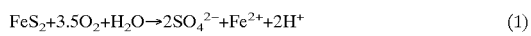
$$FeS_2 + 3.5O_2 + H_2O \rightarrow 2SO_4^{2-} + Fe^{2+} + 2H^+ \quad (1)$$

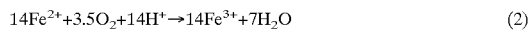
$$14Fe^{2+} + 3.5O_2 + 14H^+ \rightarrow 14Fe^{3+} + 7H_2O \quad (2)$$

$$Fe^{3+} + 3H_2O \rightarrow Fe(OH)_3 + 3H^+ \quad (3)$$

Alternatively, depending upon chemical conditions, ferric iron may be consumed to oxidize more pyrite and produce additional acidity as shown by equation 4.

$$14Fe^{3+} + FeS_2 + 8H_2O \rightarrow 15Fe^{2+} + 2SO_4^{2-} + 16H^+ \quad (4)$$

Equation 5 represents acid generation where iron is precipitated as $Fe(OH)_3$. An overall reaction for ferric iron that reacts to oxidize pyrite is shown by equation 6.

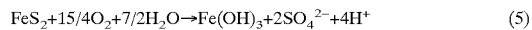
$$FeS_2 + 15/4O_2 + 7/2H_2O \rightarrow Fe(OH)_3 + 2SO_4^{2-} + 4H^+ \quad (5)$$

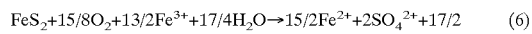
$$FeS_2 + 15/8O_2 + 13/2Fe^{3+} + 17/4H_2O \rightarrow 15/2Fe^{2+} + 2SO_4^{2+} + 17/2 \quad (6)$$

As indicated by equation nos. 1 to 6, the sulfide oxidation process is initiated in the presence of oxygen.

The rate of acid generation, once initiated, is determined primarily by factors that include the solution pH, the oxygen content of the gas phase, the oxygen concentration in the water phase, the degree of moisture saturation in interstitial pore spaces, ferric iron activity, and the exposed sulfide surface area.

The products of sulfide oxidation may be promptly flushed from the sulfide oxidation sites by water or, may accumulate until flushed by infiltrating water. When acid products are flushed away from a sulfide mineral oxidation site, they may encounter acid consuming (e.g. acid buffering) mineralization that may neutralize all or a portion of the free and metal acidities.

Another closely related problem is that of "metal leaching" where the pH of the acid drainage solutions are neutralized, but still contain elevated dissolved metal concentrations. At such sites, where elevated dissolved metal concentrations result from the buffered acid drainage, there is also adverse impact on the receiving environment. For example, elevated concentrations of dissolved zinc or copper can adversely affect the receiving aquatic environment due to their toxicity in sufficient concentrations.

Physical factors also affect the rate of acid generation. For sulfidic waste, physical factors including rock permeability are important. Sulfidic waste with high permeability and uncovered, unconsolidated surfaces may have high oxygen ingress, which in turn may contribute to increased oxidation rates. These higher rates along with higher internal temperatures due to exothermic oxidation, generally help drive convection and the ingress of oxygen from the atmosphere to sulfide minerals contained within a mass of sulfidic wastes.

Studies have indicated that the prevention/reduction of sulfide oxidation at its source(s) can be accomplished by inhibiting the input of oxygen, which is the principle ingredient for the initiation of the sulfide oxidation and the ARD generation process. Further, it should be understood that even with available oxygen and no water infiltration, the moisture content of a mass of sulfidic waste (for example, a mine waste rock dump) may be sufficient to allow sulfide oxidation and in-situ acidification to occur.

Prior art methods to alleviate the problems associated with ARD include the use of engineered dry covers, the blending of alkaline materials to assist in neutralizing acidity in situ, and underwater disposal and in situ flooding. For example, U.S. Pat. No. 6,004,069 issued Dec. 21, 1999 (Sudbury) discloses a method of constructing a composite dry cover used in the isolation and encapsulation of sulfide-bearing wastes, including rock dumps. Dry covers are generally designed to attenuate the influx of atmospheric oxygen and/or water into the underlying sulphidic wastes, consequently reducing/preventing and controlling acid generation in sulphidic wastes capped by dry covers. While dry covers may be custom designed to incorporate several layers and appropriately graded slopes, the uncertainty of the long-term performance of dry covers due to the environment (i.e. settlement, frost heaving, cracking, plant root evasion, erosion, geotextile degradation, etc. . . ), raises concerns as to their overall effectiveness in ARD prevention and control. In addition, such prior art dry covers, depending on the raw material available in the vicinity of the mass of sulfidic waste, are generally expensive to construct and to maintain.

Also, U.S. patent application Ser. No. 2001/0032725, filed Mar. 6, 2001(Harrington) discloses a process to treat acid rock dumps by three general methods (physical, chemical, and biological), and thereby reduce ARD. Harrington does not teach control of the internal atmosphere of a mass of sulfidic waste by which ARD reduction is achieved by monitoring and reacting to changing conditions. Harrington does not substantially provide the flexibility to address progressive cover degradation or changes in barometric pressure. Harrington further does not sufficiently address the impact of climactic conditions on ARD reduction.

While a significant amount of research and a number of technologies have been targeted at the prevention and control of ARD generation, prior art solutions generally focused on inhibiting the input of atmospheric oxygen. What is required is a solution whereby a substantially chemically inert internal atmosphere within the mass of sulfidic waste is provided and maintained in changing conditions. There is a further need for a method and apparatus for reducing ARD generation in relation to a mass of sulfidic waste that is easy and relatively inexpensive to apply.

SUMMARY OF THE INVENTION

One object of the present invention is an improved method for the prevention and/or the reduction of ARD generation in relation to a mass of sulfidic waste.

One aspect of the present invention is a process for treating earth materials, such as a mass of sulfidic waste, to prevent and/or to control the oxidation of sulfide minerals and the generation of ARD and metal leaching. In this context, the invention involves the application of inert gas mixtures (IGM) within a mass of sulfidic waste, or within covers or shells that encapsulate mass of sulfidic wastes, or both within mass of sulfidic wastes and within covers or shells encapsulating the mass of sulfidic waste.

A still other aspect of the present invention is a method of preventing and controlling sulfide mineral oxidation and generation of acid rock drainage in a mass of sulfidic waste that is provided with a cover, the method comprising: application under the cover of an oxygen deficient/non-reactive gas mixture, substantially throughout the mass of sulfidic waste, in a quantity sufficient to create a pressure differential between the inside of the mass of sulfidic waste and the open atmosphere outside and adjacent to the mass of sulfidic waste, such that the oxygen gas concentration inside the mass of sulfidic waste is substantially equal to, or less than, the atmospheric oxygen gas concentration outside and adjacent to the mass of sulfidic waste.

BRIEF DESCRIPTION OF THE DRAWINGS

A detailed description of the preferred embodiment(s) is(are) provided herein below by way of example only and with reference to the following drawings, in which.

Figure 1:
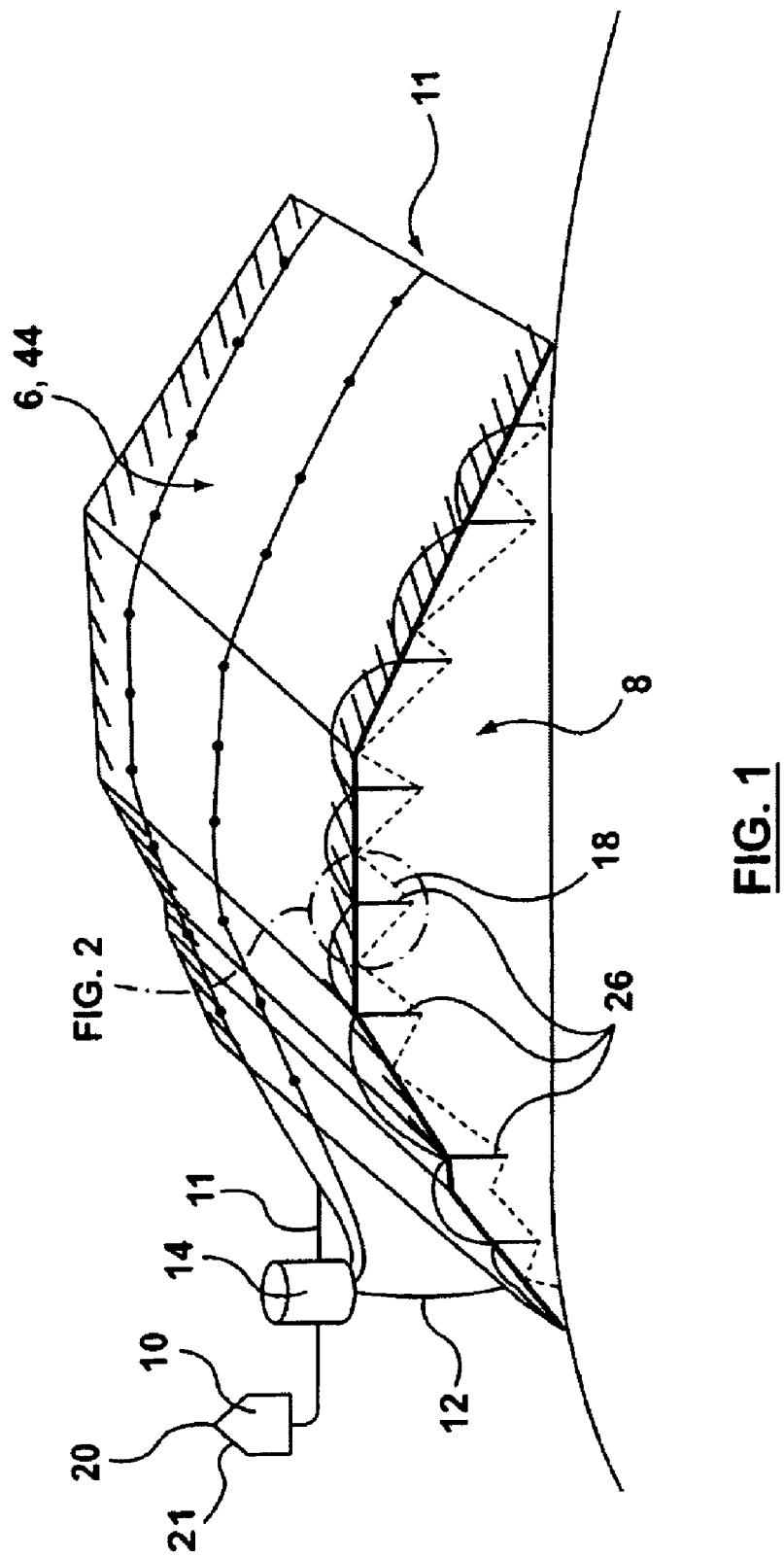
FIG. 1 is a cross-section depicting the general process by which a nitrogen gas rich gas mixture (NGRGM) is injected into a Mass of sulfidic waste, a mine waste rock dump in this example, which has the potential to produce ARD, in one particular embodiment of the present invention.

In the drawings, preferred embodiments of the invention are illustrated by way of examples of the application of the present invention in the context of s mass of sulfidic waste. It is to be expressly understood that the description and drawings are only for the purpose of illustration and as an aid to understanding, and are not intended as a definition of the limits of the invention.

DETAILED DESCRIPTION OF THE PREFERRED EMBODIMENT

One embodiment of the present invention is the application of IGM to prevent and/or to control the influx of atmospheric oxygen to sulfide minerals so as to prevent and/or to control sulfide mineral oxidation and the generation of acid rock drainage also known as acid mine drainage and acidic drainage. In this regard, the present invention can be applied to prevent and/or to control the generation of ARD in waste materials generally prone to ARD. These waste materials are broadly referred to in this description as "sulfidic waste" or a "mass of sulfidic waste" which include: sulfidic waste rock dumps and piles, spent heap leach piles, and sulfidic spoil and overburden produced by mining and/or civil construction activities; sulfidic mine tailings; sulfidic mineral concentrates; underground mine workings including stopes, glory holes, shafts, drifts, cross-cuts, raises, ramps, portals, fracture zones and faults exposed within underground workings, and ancillary underground openings; and mine backfill including rock fill, hydraulic tailings fill, thickened tailings fill, and paste fill.

Inert gas mixtures (IGM) are oxygen deficient gas mixtures that do not chemically react with a mass of sulfidic wastes to cause ARD or metal leaching. IGM generally contain no measurable concentration or a trace concentration of oxygen as may be determined by known methods. Examples of IGM are: (1) nitrogen gas rich gaseous mixtures (NGRGM) produced by known methods such as nitrogen generators, or alternatively by using chemical/biological processes; (2) gases such as carbon dioxide and argon and gas mixtures that may be obtained from various sources such as gas suppliers, liquid and solidified gas suppliers, and/or produced by using known gas/gas mixture generation processes. IGM are generally referred to in this disclosure as "oxygen deficient/inert gas mixtures".

As part of the present invention, IGM are applied in a systematic manner to compensate for the oxygen partial pressure loss that occurs within a mass of sulfidic waste and/or within covers or shells encapsulating the mass of sulfidic waste. Also, as part of the present invention, IGM are applied to compensate for the partial internal pressure loss due to oxygen consumption as a result of sulfide oxidation and mitigate the influx of oxygen from the open atmosphere through covers/shells that encapsulate mass of sulfidic waste, and/or the compacted surfaces of mass of sulfidic waste, to the internal gas atmosphere of the mass of sulfidic waste.

In a first step of one aspect of the invention, oxygen deficient/inert gas mixtures are applied systematically to a mass of sulfidic waste so as to compensate for the partial internal pressure loss of oxygen due sulfide oxidation, and create acceptably low concentrations of oxygen (e.g. 0 to trace concentrations of oxygen gas) within the internal atmosphere of the mass of sulfidic waste, or within covers/shells that encapsulate mass of sulfidic waste, or both within mass of sulfidic waste and within covers/shells encapsulating mass of sulfidic waste.

IGM are applied in a controlled and systematic manner in reference to monitoring data and observations. The IGM is applied to achieve oxygen gas deficient conditions within the mass of sulfidic waste or within the covers/shells that encapsulate mass of sulfidic waste or both within the mass of sulfidic waste and covers/shells thereby substantially preventing and controlling ARD-generating sulfide mineral oxidation.

The rate at which IGM are applied during this step of the present invention will vary generally depending upon the physical and chemical characteristics of the mass of sulfidic waste and encapsulating covers/shells, and sulfide minerals, and site-specific factors including local climatic and meteorological conditions.

In the second step of one aspect of the present invention, IGM are applied on a continuous or intermittent basis to maintain acceptable ranges of oxygen gas concentrations within the internal atmosphere of mass of sulfidic waste, or within covers/shells that encapsulate mass of sulfidic waste, or both within the mass of sulfidic waste and within covers/shells encapsulating the mass of sulfidic waste.

During this second step, acceptable oxygen gas concentrations (within the internal atmosphere of the mass of sulfidic waste, or within covers/shells that encapsulate the mass of sulfidic waste, or both within mass of sulfidic waste and within covers/shells encapsulating mass of sulfidic waste) vary in relation to ARD prevention or ARD control objectives.

At locations where the key objective is to prevent sulfide generation in the mass of sulfidic waste, IGM application rates are determined in order to maintain acceptable ranges of oxygen gas concentrations (e.g. zero to trace concentrations of oxygen gas as determined by known methods) within the internal atmosphere of the mass of sulfidic waste, or within covers/shells that encapsulate the mass of sulfidic waste, or both within the mass of sulfidic waste and within covers/shells encapsulating mass of sulfidic waste, in order to prevent sulfide generation.

It should be noted that generally in this disclosure by "inside the mass of sulfidic waste" what is meant is within the internal atmosphere of the mass of sulfidic waste, or within covers/shells that encapsulate the mass of sulfidic waste, or both within the mass of sulfidic waste and within covers/shells encapsulating the mass of sulfidic waste At locations where the key objective is to control sulfide generation in the mass of sulfidic waste, IGM application rates are controlled in order to maintain acceptably low concentrations of oxygen gas inside the mass of sulfidic waste in order to control sulfide oxidation and ARD generation. For example:

where sulfide minerals inside the mass of sulfidic waste do not readily oxidize or where the mass of sulfidic waste otherwise has low capacity to generate ARD and contain quantities of suitable acid-buffering materialization, there may be benefits to applying IGM to reduce and control the rates of oxygen influx so as to reduce and control the rates of acid generation such acidity generated can be substantially buffered in situ. In this example, an order of magnitude reduction in the oxygen gas concentration (e.g. from some 20.9% $O_2$ in the open atmosphere to about 2% $O_2$ within the internal atmosphere of the mass of sulfidic waste/ encapsulating covers/shells, or within both mass of sulfidic waste and covers/shells), may be acceptable for some mass of sulfidic waste in terms of reducing the rate of sulfide oxidation to a level so as to allow acidity to be substantially buffered in-situ; and where ARD from the mass of sulfidic waste is collected and treated, it may be beneficial to substantially reduce the rates at which ARD will be generated in the future so as to progressively reduce future ARD treatment requirements and future annual treatment costs. In this example, it could be possible to progressively reduce future requirements for the chemical (e.g. lime-based) treatment of ARD so as eventually allow lower cost passive (e.g. biological) treatment of ARD treatment.

The rate at which IGM are applied during the second step of the present invention varies generally depending upon the physical and chemical characteristics of the mass of sulfidic waste and encapsulating covers/shells, and sulfide minerals, and site-specific factors including local climatic and meteorological conditions.

Referring to the drawings, there is depicted in FIG. 1 a cross-section which illustrates a representative application of the process of the invention whereby an oxygen deficient/inert gas mixture such as a NGRGM is injected into a pre-existing mass of sulfidic waste, namely a rock dump in this example.

It should be understood that the size, shape, and characteristics of each mass of sulfidic waste may vary considerably, and therefore the process of the present invention, as illustrated in FIGS. 1 to 10 is not limited to the particular pre-existing masses of sulfidic waste depicted. For instance, the geologic materials used to construct a dump may vary in their mineralogy, physical and chemical properties (i.e. resistance to weathering, reactivity, sulfide and buffering mineral contents, acid potential, buffering potential, net acid potential, particle sizes, particle size distribution, degree of oxidation, etc. . . ). A mass of sulfidic waste may also vary with the methodology by which they are produced, type of equipment used, topography, climate, foundation conditions, waste compaction and settlement of the mass of sulfidic waste.

In one aspect of the present invention, the method of the present invention includes the use of dry covers that aim to reduce the ingress of atmospheric oxygen into a a mass of sulfidic waste such a dump, in addition to the application of NGRGM as disclosed herein. There are two main aspects to the functioning of known dry covers. First, the ingress of atmospheric oxygen to the sulfide minerals contained within a mass of sulfidic waste such as a rock dump is limited by the rate at which atmospheric oxygen diffuses through the interstitial pore spaces in the cover. Second, some covers also include oxygen-consuming components (such as decaying organic matter) which further reduce the flux of atmospheric oxygen through the cover and to the sulphidic materials. Both functions ultimately serve to reduce atmospheric oxygen influx and ARD-generating sulfide oxidation. While there are many variations in the size, shape, and characteristics of a mass of sulfidic waste such as waste rock dumps, they are all layered in different variations depending on the unique site-specific factors of each rock dump.

As is readily apparent to a person skilled in the art, the application of the method described below depends on the site conditions of the particular mass of sulfidic waste in question. This makes it desirable, to access existing data regarding site conditions, or collect this data if it has not been collected already. There are a number of sets of data relevant to the application of the present method. The first set of data relates to the mineralogy of the site which data can be obtained from geological surveys, geophysical methods or remote sensing. The second set of data relates to the state of oxidation process inside the mass of sulfidic waste. This can be measured by field investigations including drilling, trenching and sampling and analyses. The third set of data relates to the seepage quality of the mass of sulfidic waste. This last set of data is particularly relevant to application of the method of the present invention to monitor for indications of sulfide oxidation and metal leaching. This is usually determined based on chemical analyses in accordance with methods that are well known. A fourth parameter that may be important in applying the present invention is the interior temperature of the mass of sulfidic waste. Temperature is measured using a known thermometer embedded within the mass of sulfidic waste.

It should be understood that the present invention contemplates the collection of additional data that affects the ARD process, in order to practice the method of the present invention in light of the particular site conditions affecting a mass of sulfidic waste at a particular point in time. The present invention also contemplates the use of a variety of known techniques and devices for collecting site condition data.

Referring to FIG. 1, there is depicted a pre-existing mass of sulfidic waste, and specifically a rock dump that has been filled to its final configuration, with its slopes re-graded to provide for stable slopes. Specifically, the rock dump comprises a sulphidic substrate 8, covered with a covering surface such as a vegetation layer 6 and/or local soil cover 44. FIG. 1 illustrates a representative rock pile commonly found at many typical mine sites.

Generally the source of an oxygen deficient/inert gas mixture, in this example nitrogen generator 10, is located either on site or away from the rock dump and which in this example generates NGRGM from nitrogen extracted from the atmosphere, in a manner that is known. In another aspect of the present invention, the NGRGM may be produced using chemical/biological process, or may be purchased in prepared forms through a distributor.

One aspect of the present invention is a system for preventing and controlling sulfide mineral oxidation and generation of acid rock drainage in a mass of sulfidic waste, as illustrated in the various Figures, including FIG. 1. The present invention includes a distribution system 11 for distributing the NGRGM to the sulphidic substrate 8. In the embodiment of the invention illustrated in FIG. 1, the distribution system 11 includes a known pipeline 12 made of steel or plastic that directs the oxygen deficient/inert gas mixture from gas dispensing apparatus to the mass of sulfidic waste. In the example illustrated in FIG. 1, the NGRGM is directed from the nitrogen generator 10 to a receiver tank 14 used for NGRGM storage where it awaits release into the rock pile.

The present invention also includes one or more sensing means or sensors 22 for detecting nitrogen-rich/oxygen-deficient conditions, and other conditions affecting ARD cited above, within the rock pile and in its immediate vicinity, in a manner that is known. The sensors 22 are functionally linked to a microprocessor 20 for monitoring the conditions at the rock pile. The present invention contemplates the use of a variety of different types of sensors 22 for detecting various different conditions that may affect the ARD process. The present invention also contemplates loading a control program 21, provided in a manner that is known, for controlling the monitoring processes of the microprocessor 20 and the sensors 22. Another aspect of the present invention is therefore a computer program product, namely the control program 21, which loaded on a computer is adapted to instruct the computer to: monitor the acid rock drainage conditions of the mass of sulfidic waste via the sensing means; and based on the monitored acid rock drainage conditions of the mass of sulfidic waste, activating the distribution system to apply substantially throughout the inside of the mass of sulfidic waste an oxygen deficient/non-reactive gas mixture in a quantity sufficient to create a pressure differential within the mass of sulfidic waste.

As illustrated in FIG. 1, the pipeline 12 delivers NGRGM to a plurality of injection points over the sulphidic substrate 8. The present invention contemplates various configurations of the pipeline 12 to achieve distribution of NGRGM inside the rock pile substantially along the entire surface thereof.

Figure 2:
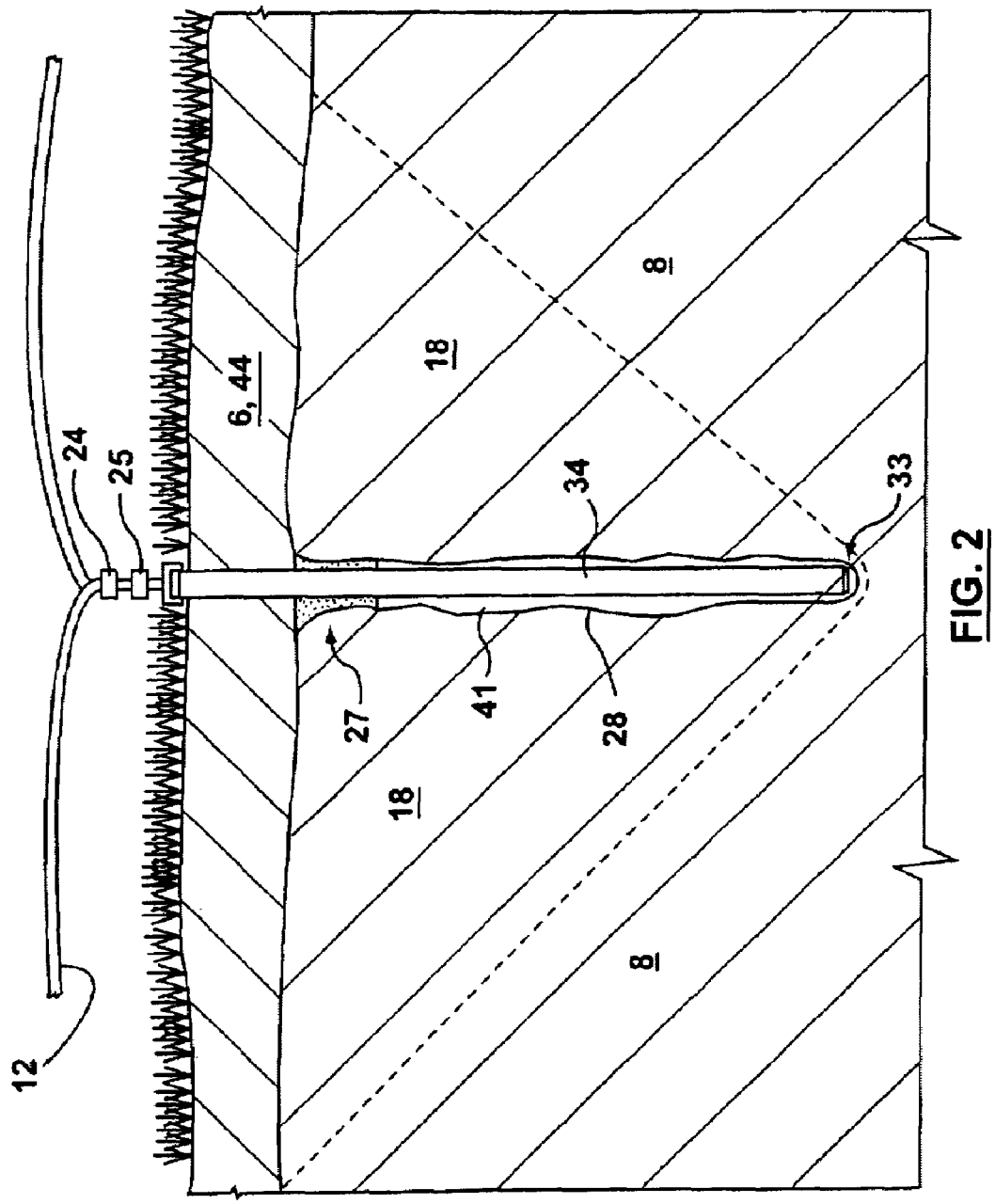
FIG. 2 is a detailed cross-section of a NGRGM injection assembly.

Each injection point shown in FIG. 2 pipeline is provided with an injection assembly 26 of the present invention.

It is immediately obvious to a person skilled in the art, that the selection of the appropriate number and location of the injection points affects the efficacy of the present invention in controlling sulfide oxidation and ARD. Therefore, in a manner known to those skilled in the art, the injection points in the sulphidic substrate 8 or other ARD-generating source are selected based on the unique characteristics and site-specific factors of the rock dump. The predominant purpose of the injection points is to facilitate the distribution of NGRGM within the sulphidic substrate 8.

In practice of the present invention, the injection points are generally provided such that the injection assembly 26 is generally disposed within the sulphidic substrate 8 at approximately one third the depth of the sulphidic substrate 8 in relation to each particular, as illustrated in FIG. 1. In terms of the recurrence of injection points and their configuration in relation to the sulphidic substrate 8, the optimal distribution of the injection points will depend on the porosity of the material comprising the mass of sulfidic waste and other factors. For the purposes of this invention, the injection points are to be distributed along the rock pile in a manner that encourages distribution of the NGRGM throughout the inside of the rock pile. As a guide, the injection points are preferably spaced apart such that their cones of influence (drawn upward from the bottom of the hole and at approximately 45 degrees from the axis of the hole) intercept within or at the surface of the dump, as shown in FIG. 1.

Another function of the control program 21 is that it provides computer programming provided in a manner known to those skilled in the art to release NGRGM from the receiver tank 14 through the pipeline 12 into the NGRGM into the injection points in the sulphidic substrate 8 in accordance with the parameters explained below.

In another embodiment of the invention, the NGRGM receiving tank 14 is not included, and instead the NGRGM generator 10 is directly linked with the various valve mechanisms via the pipeline 12, as described below.

Referring to FIG. 2, the injection assembly 26 of the present invention is illustrated.

In order to insert the injection assembly 26 within the various injection points, either the rock pile will be built to dispose the various injection assemblies 26 within the hole 28 shown in FIG. 2, or the hole 28 will be drilled in the sulphidic substrate 8 using a conventional drill and bit, in a manner that is known. In a representative implementation of the present invention, without limiting the scope thereof, the hole 28 has a four inch diameter. The injection assembly 26 includes a distribution pipe 32 which is generally a pipe with a plurality of apertures such as slots 34 for dispensing the NGRGM within the hole 28. The slots 34 are generally distributed even along the portion of the distribution pipe 32 that is disposed inside the sulphidic substrate 8 in accordance with the present invention. Again in a representative illustration of the present invention, the slots 34 are 0.25×4 inch diagonal slots disposed along the distribution pipe 32 at one slot 34 per foot along the surface of the distribution pipe 32. The slots 34 permit the NGRGM to migrate from the interior of the pipe to the gas-filled interstitial voids in the sulphidic substrate 8.

It should be understood that the hole 28 is provided, and/or the injection assembly 26 is disposed within the hole 28 such that the height of the injection assembly 26 protrudes from the dry cover 30, as best shown in FIG. 2.

The distribution pipe 32 preferably includes a pipe cover 33 or some other cap that encourages the distribution of NGRGM substantially horizontally within the sulphidic substrate 8 rather than vertically which may result in the injection assembly 26 shooting out of the hole 28.

The injection assembly 26 of the present invention also includes an actuator valve 24 and a check valve 25, as shown in FIG. 2. The actuator valve is a known mechanism such as a solenoid valve that is connected by means of a circuit along the distribution system 11 to receive signals from the microprocessor 20 to open or close the supply of NGRGM to the particular injection assembly 26.

The check valve 25 is a known apparatus that allows the NGRGM to enter the injection assembly 26b, but prevents its back flow in the event of a NGRGM feed pipe or receiver leak. A gas-tight piping system connects the NGRGM receiver tank 14 (in the embodiment that includes a receiver tank 14) to each of the check valves 25, and a gas-tight shut-off valve is installed between the check valve and the NGRGM distribution pipe 32 to allow the NGRGM injection assemblies 26 to be independently isolated In regard to the application of the present invention in relation to a pre existing rock pile, it should be understood that in order to install the injection assembly 26 illustrated in FIGS. 1 and 2, the depth of the hole 28 is preferably measured in relation to the depth of the rock pile at that particular point. However, prior to any drilling, the dry cover 30 is preferably removed at the drill hole collar in order to prevent the cover materials from entering into the hole 28 or piping. In one particular implementation of the present invention where the holes 28 required are of different sizes, the various distribution pipes 32 are cut to custom fit the measured hole 28 depth, also taking into account the thickness of the dry cover 30. Once the piping is prepared, it is then lowered into the hole using ropes and/or clamping devices and other equipment as deemed necessary (i.e. tripod, crane), in a manner that is known.

Referring to FIG. 2, the method described herein contemplates preferably anchoring the pipe 32 within the hole 28. In a particular implementation of the present invention the injection assembly 26 is anchored within the hole 28, thereby further discouraging the injection assembly 26 from being pushed out of the hole 28 by means of application of the pressurized NGRGM. For example, the anchor may include a pair of known steel U-bolts attached to the distribution pipe 32 and adapted to anchor the injection assembly in manner that is known.

In yet another particular embodiment of the present invention, the injection assembly 26 is further anchored, as shown in FIG. 2 by introducing into the hole 28 certain materials. First, a screen (Passing 0.5 inch screen) of clean, non-acid generating stone is introduced along the length of the slotted portion of the distribution pipe 32. The screen layer is then capped with a wood form, which serves as a bottom form for a grout mixture. Above the wood form a grout plug 27 is then poured into the annulus to secure the distribution pipe 32 within the hole 28.

In another embodiment, where the rock dump is being simultaneously created with a NGRGM injection assembly, a dry cover would be constructed over the dump following the complete installation of all the NGRGM injection assemblies.

In most specific applications of the present invention, following the complete installation of the NGRGM injection assemblies 26 into the rock dump or other ARD-generating source, the nitrogen generator 10 is installed proximate to the site. In another embodiment of the invention, the dump may also be temporarily encapsulated with an engineered geomembrane (or layers or plastic sheeting) and then injected with NGRGM to vent the rock dump.

One of the features of this invention is the ability of the inert gas mixture, NGRGM in this example, to be selectively piped into the gas-filled interstitial spaces within the sulphidic substrate 8. The system of the present invention consists of a control program 35 loaded on a memory 36 that is functionally linked with the microprocessor 20 such that the microprocessor 20 controls the release of the NGRGM from the receiver tank 14 (or NGRGM generator 10 in another embodiment lacking a receiver) via the NGRGM injection assembly to the gas-filled interstitial spaces within the rock dump. The general function of the automated system is to ensure that the oxygen gas concentration inside the dump is equal to or less than atmospheric oxygen gas concentration. The automated system would therefore monitor the following, but would not be limited to: the NGRGM pressure in the receiver, distribution system 11 including the various injection assemblies 26, the internal gas, external and internal dump temperatures, the concentrations of nitrogen and oxygen gases inside the dump, and the atmospheric barometric pressure.

Therefore the control program of the present invention provides a series of control routines for controlling ARD by application of NGRGM in accordance with the present invention. In one aspect of the control program, a series of preprogrammed control routines are provided to the control program of the present invention. These control routines are adapted by the control program in response to input affecting ARD that is understood by the control program. The input is generally provided by a user in a set-up routine of the control program, in a manner that is well-known. The input by the user generally includes data on permanent site conditions. In addition, the control program is responsive to input received from the various sensors 22 to adjust the control routines, thereby adjusting the application of the NGRGM in accordance with the present invention.

The present invention further contemplates provision of a series of site condition templates defining sets of control routines, based on common conditions at mine sites affecting ARD.

The control program includes any manner of known input interface such as drop down menus and the like for providing data regarding site conditions, or selecting between site condition templates, in a manner that is known.

It should be understood in a manner that is known to those skilled in the art, the control program of the present invention is adapted to adjust the delivery of NGRGM to substantially maintain over time ARD control conditions, notwithstanding changes in conditions affecting ARD generation such as barometric pressure.

It should be understood that the benefit of marginally pressurizing the interior of the dump in relation to a set point barometric pressure at the dump location is to mitigate the atmospheric oxygen flux into the mine waste rock dump.

Once the NGRGM injection assembly 26, in some embodiments, the dry cover 30, has been installed, NGRGM would be injected into the assemblies based on a volume that is appropriate given the temperature, volume, and gas pressure within the dump. The examples in operation set out below illustrate the determination of appropriate values in specific circumstances, in a manner that is well known to a person skilled in the art.

Due to the natural sulfide oxidation process alone, the oxygen concentration may be expected to progressively decrease over time to reduced levels from approximately 20.95% to 10% by volume over a period of some 60 days. As part of the present invention, the rate of IGM application is controlled, and in this example is set so that the volume of NGRGM, for example, initially injected will compensate for approximately one quarter of the partial pressure of the oxygen consumed by the natural sulfide oxidation process, and is injected at a relatively low volume and pressure.

Due to the influx of NGRGM, any displaced gases would be permitted to diffuse through the dry cover 30 to the atmosphere to prevent excessive pressure build up within the interstitial spaces of the rock dump.

In another embodiment of the invention, such as where a dump has been covered by a geomembrane as described earlier, internal dump atmosphere vents may be installed within the rock dump to ease over-pressurization concerns with the rock dump. Such a venting procedure would also reduce the time to dissipate displaced gases from the dump, as a quick release mechanism could quickly react to sudden pressure changes. This particular embodiment of the invention involves reversing the check valve 25 on top of one or more injection assemblies 26 to allow the pipe to vent to the atmosphere and ultimately prevent back-flow from the atmosphere to the interstitial spaces within the dump. A protective mechanism would be installed with the check valve 25 so as to clearly indicate the flow direction, without risk of climactic or environmental interference (such as snow or rain). An internal atmospheric vent would also be installed between two NGRGM injection assemblies 26 to accommodate any gas movement through the interstitial spaces of the rock dump.

Once the desired nitrogen-rich/oxygen-deficient internal atmosphere is achieved, the NGRGM may be injected on either a continuous or intermittent basis. In one embodiment of the invention, particularly where the sulfide wastes are highly reactive, the conditions within a rock dump may require that NGRGM be maintained at a continuous rate with a range of approximately 1 to 2 times the measured oxygen gas diffusion rate. In another embodiment of the invention, particularly where the sulfide wastes do not readily oxidize or where NGRGM injection is used with a dry cover, NGRGM injection may be achieved on an intermittent basis.

Figure 3:
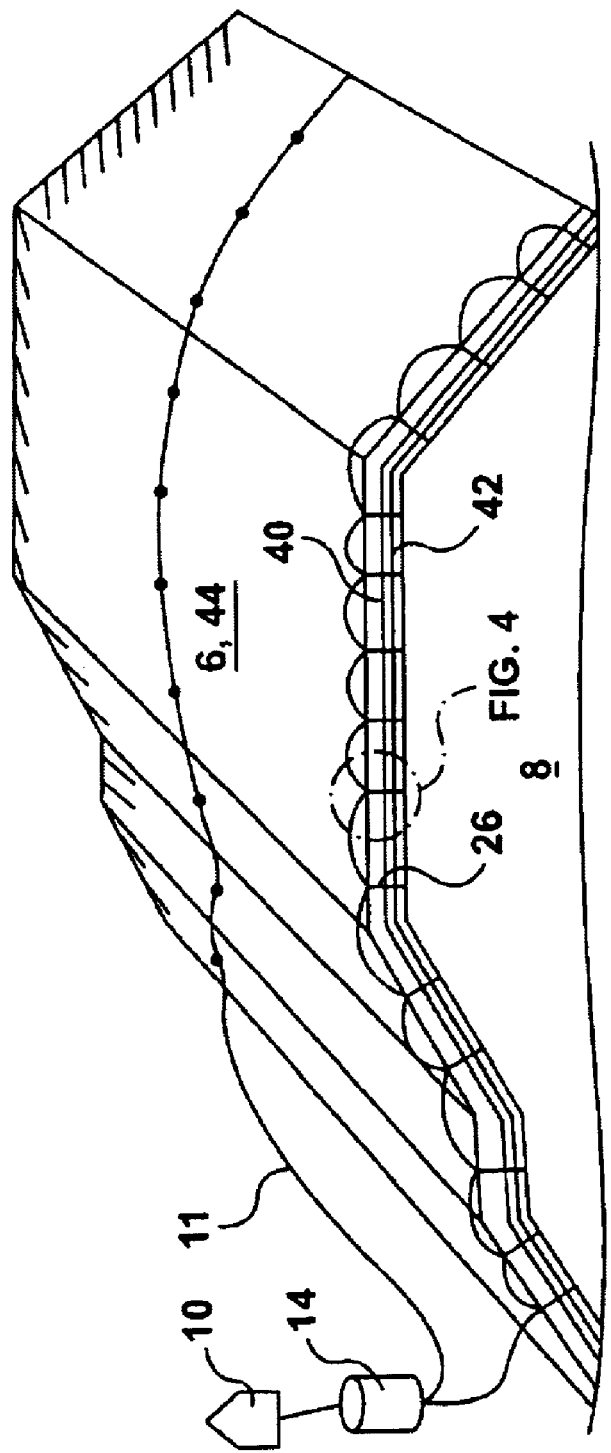
FIG. 3 is a cross-section illustrating the general process where NGRGM is injected into the capillary break layer of an engineered dry cover.
Figure 4:
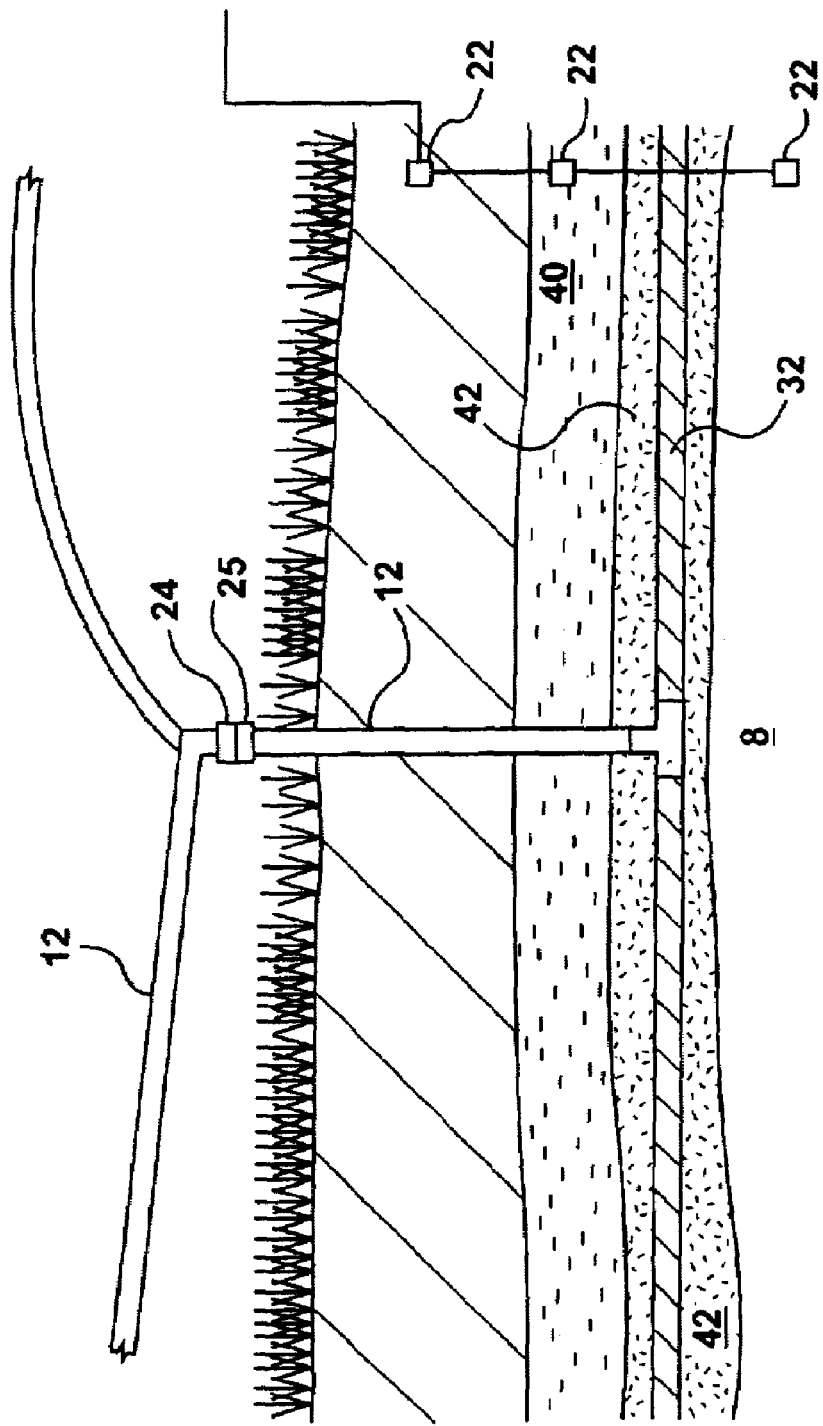
FIG. 4 is a detailed cross-section illustrating the use of a perforated pipe to distribute NGRGM in the capillary break layer of an engineered dry cover.

In another embodiment of the invention, the NGRGM injection assembly is modified and used in conjunction with an "engineered dry cover" which includes a moisture-retaining layer 22 superimposed above a capillary break layer 40. FIG. 3 demonstrates how the capillary break layer 40 operates at the site at which NGRGM is piped and released. As illustrated in FIG. 4, and unlike the vertical slotted pipe illustrated in FIG. 2, the slotted pipe 32 in this embodiment of the invention generally rests in a horizontal fashion along the bottom of the capillary break layer 40 after bifurcating from the vertical component of the pipe 12. This embodiment of the invention is intended to enhance the performance of the dry cover in achieving the desired nitrogen-rich/oxygen-deficient conditions. In the previously described embodiment of the invention where NGRGM is injected in an intermittent basis, the NGRGM injection into the capillary zone will only occur when the moisture-retaining zone 22 within the dry cover is insufficiently moisture saturated and poses a risk of allowing atmospheric oxygen diffusion through to the rock dump. Therefore, another aspect of the present invention is a modified dry cover 30 whereby the capillary zone is used to diffuse NGRGM, as best illustrated in FIG. 4.

In addition to the capillary break layer 40 serving its normal function as a capillary break to mitigate the under-draining of moisture from the moisture-retaining layer 22, the void spaces within the capillary break 40 layer will be injected with the NGRGM. Furthermore, the presence of the NGRGM will marginally pressurize (approximately 1 to 5 mbars) the capillary break in comparison to set point atmospheric barometric pressure, as described above. This will assist in limiting the diffusion of atmospheric oxygen through the moisture-retaining layer 22.

Figure 5:
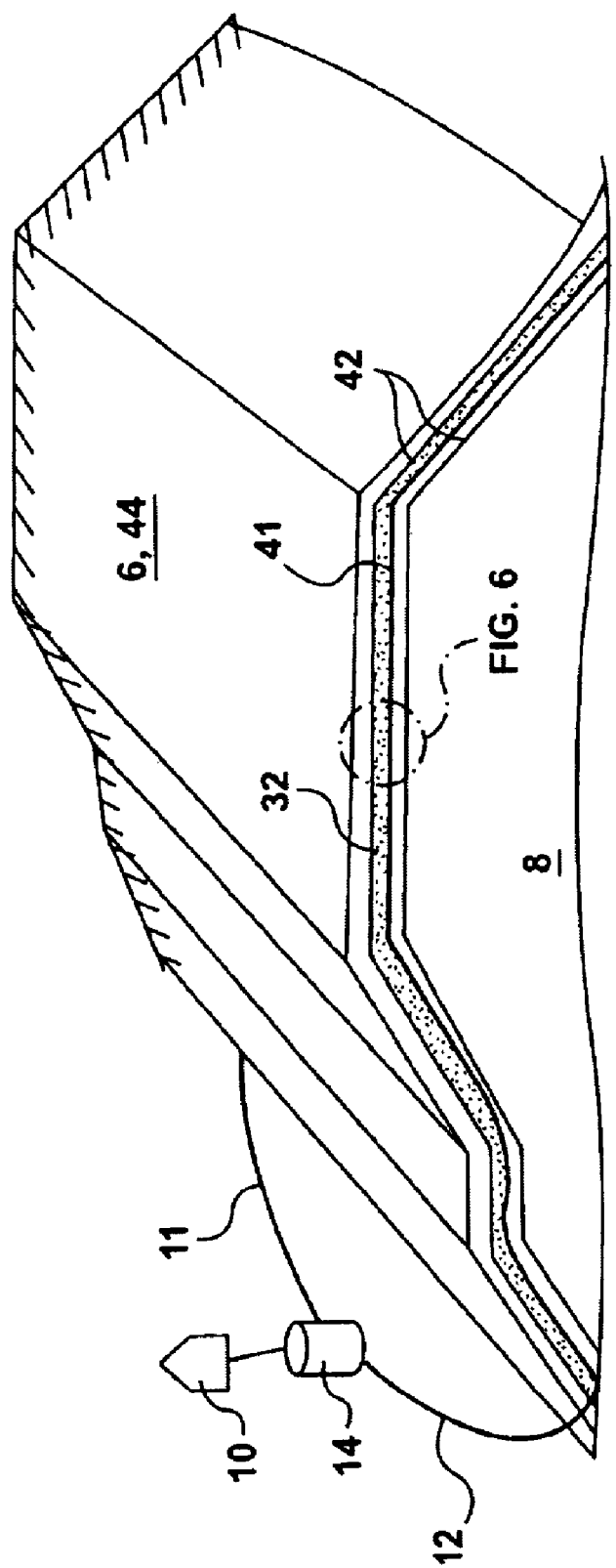
FIG. 5 is a cross-section illustrating the general process whereby NGRGM is injected into a sandwiched rock layer constructed over a zone which has the potential to generate ARD, such as a rock dump.
Figure 6:
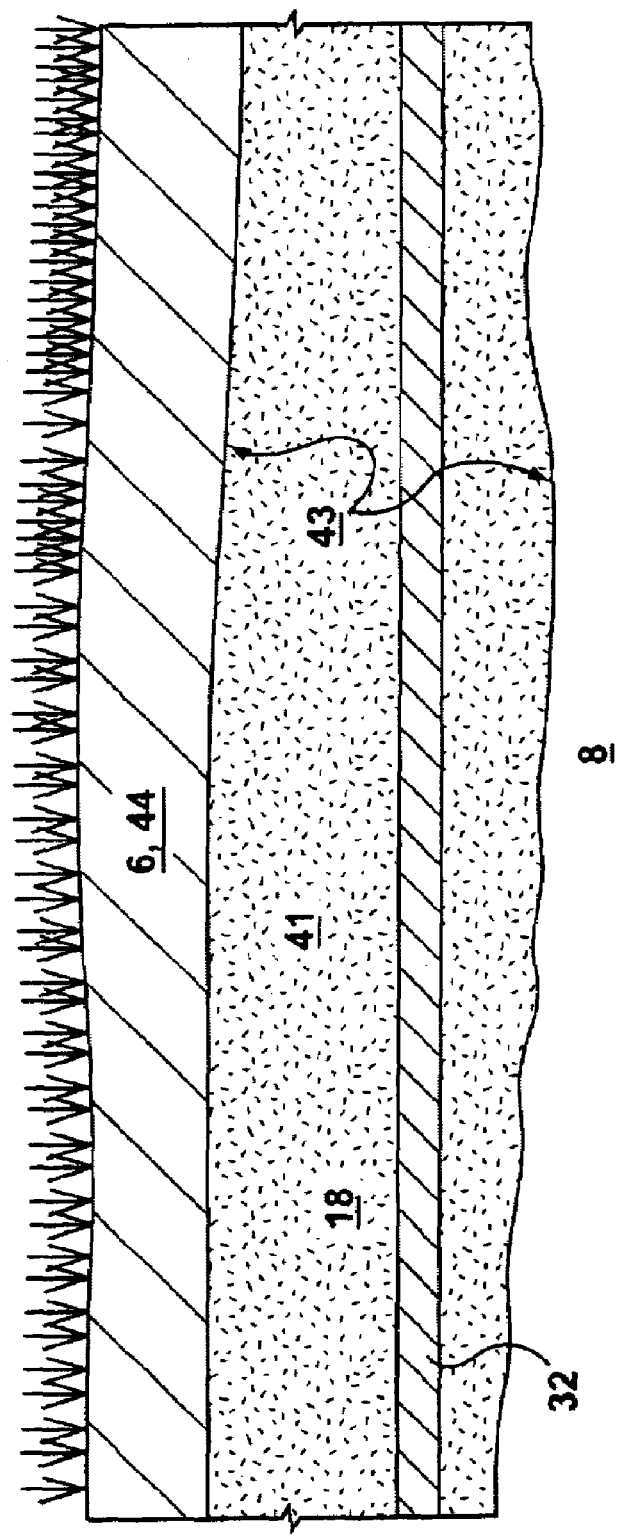
FIG. 6 is a detailed cross-section illustrating of a permeable shell and NGRGM distribution pipe.

FIG. 5 illustrates another embodiment of the invention where a permeable shell is created which creates a permeable layer sandwiched between compacted surfaces and/or covers that extend over the surface of the dump. Here, the top and side surfaces of the dump have been compacted and are further covered with a permeable layer of a non-acid generating rock 41. This non-acid generating rock 41 is then surface-compacted or covered using non-acid generating materials derived from local soils, membrane(s), or an engineered dry cover 44. In another embodiment of the invention, the non-acid generating rock 41 is both compacted and covered by the non-acid generating materials derived from local soils, membrane(s), or an engineered dry cover. FIG. 6 details how the permeable shell includes slotted piping which assists in distributing the NGRGM within the shell, as the NGRGM migrates through the pipe slots to the voids in the permeable shell. The permeable shell is a permeable layer sandwiched between compacted surfaces and/or covers over the surface of the dump. The general purpose of this embodiment of the invention is to use NGRGM to produce a marginal pressure gradient across the top cover of the dump and to also isolate the interior portion of the rock dump that is encapsulated by the permeable shell.

The NGRGM is used to compensate for the oxygen partial pressure loss in the void spaces in and beneath the permeable shell, and to displace unconsumed oxygen in the shell's void spaces. Once NGRGM conditions are attained within the void spaces in the shell, conditions can be maintained in an acceptable range through intermittent injection of NGRGM, in accordance with the previously detailed embodiment of the invention.

Figure 9:
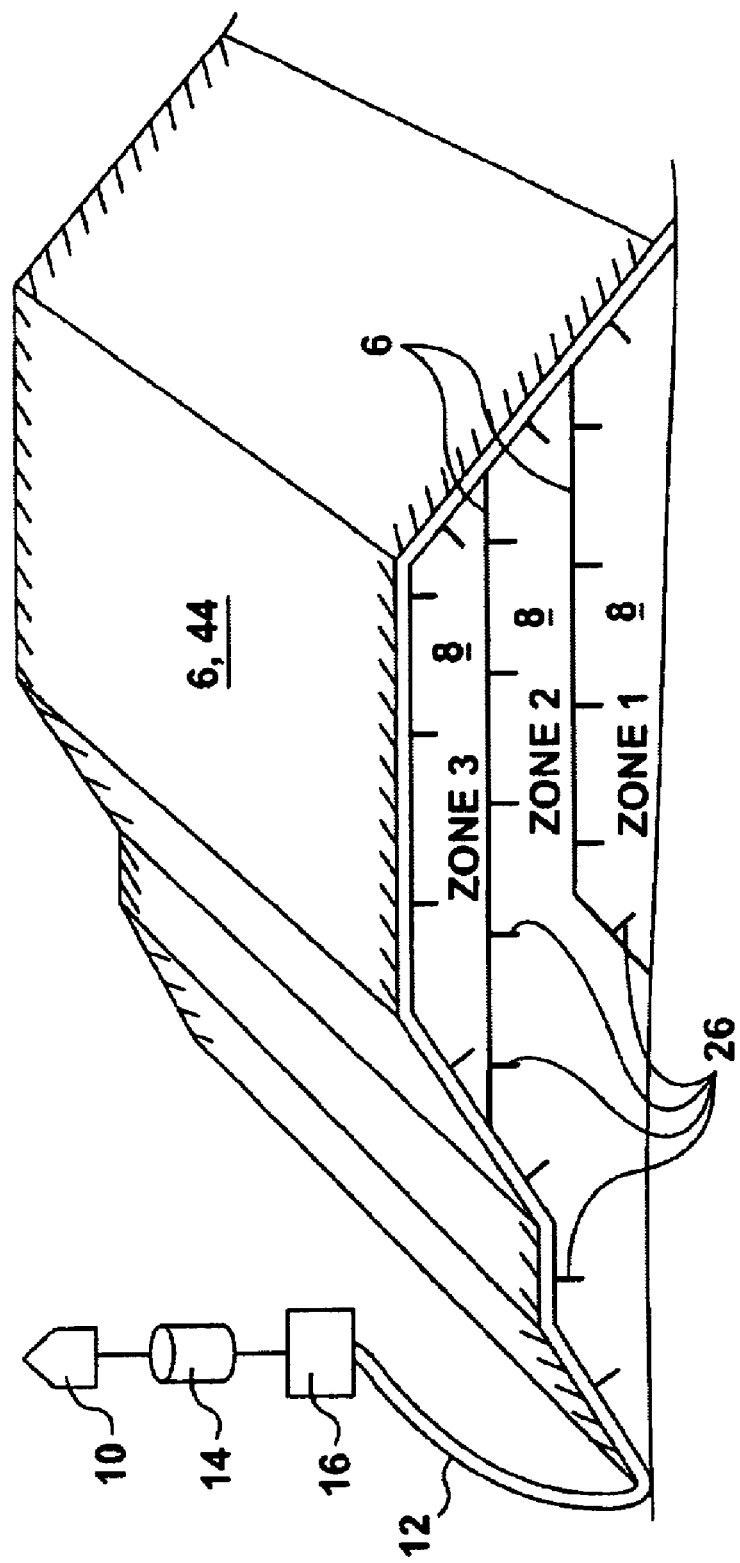
FIG. 9 is a cross-section illustrating the general process where cooled or liquefied NGRGM is injected into one or more internal zones in a sulphidic rock dump, or other zone which has the potential to generate ARD.

In yet another embodiment of the invention, as illustrated in FIG. 9, NGRGM is chilled prior to being injected into the rock dump. According to another embodiment of the invention, NGRGM is liquefied prior to being injected into the rock dump. Cooling or liquefying NGRGM also reduces the interior rock dump temperatures and thereby assists in the mitigation of sulfide oxidation and ARD generation within the rock dump. This process includes the use of commercially available or custom built equipment to facilitate the cooling and/or liquefying of NGRGM for injection into a rock dump and further contemplates the use of appropriate materials safety programs. Furthermore, this embodiment of the invention also includes the use of a site-specific system to permit excess NGRGM to be directed to another section of the rock dump, vented into the atmosphere, or possibly collected for nitrogen recycling at a nitrogen generator.

Figure 10:
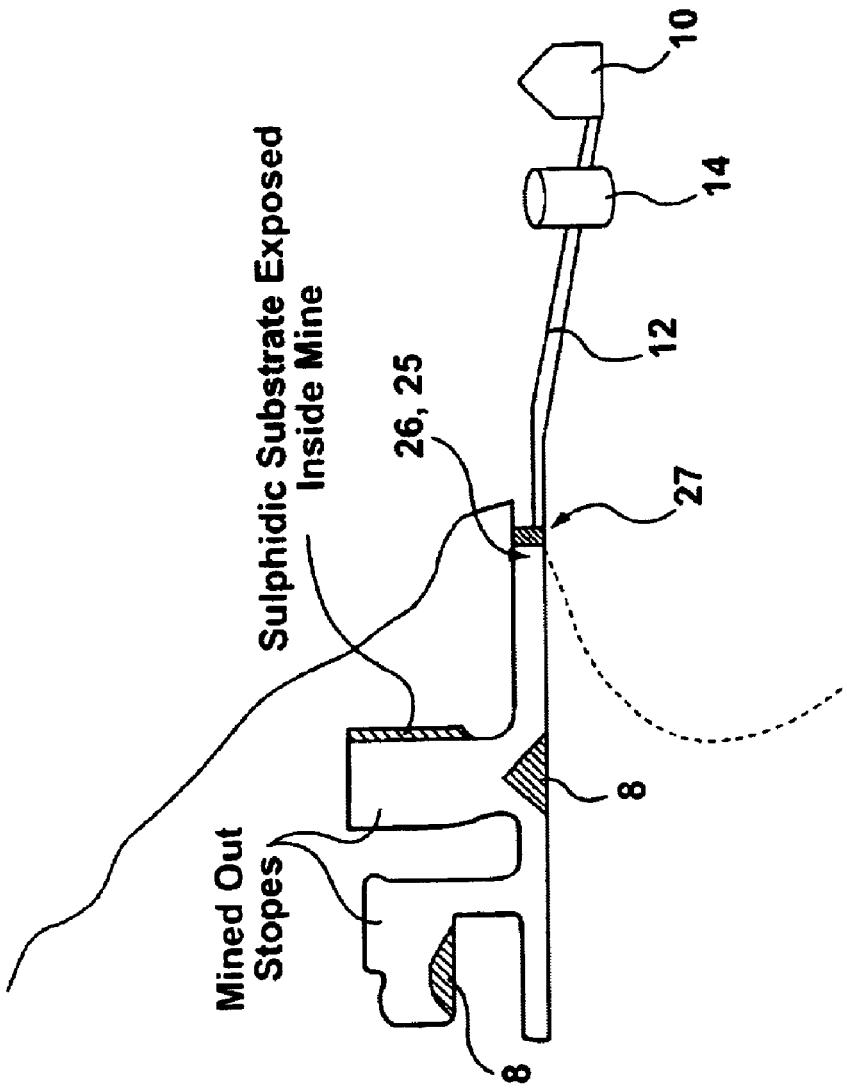
FIG. 10 is a detailed cross-section illustrating the process where NGRGM is injected into existing and inactive underground mines.

Another embodiment of the invention FIG. 10 depicts a process by which NGRGM is injected into inactive mine workings. At disused mine working sites, sulfides are present in mined-out stopes, on sulfide surfaces and in fracture zones that are exposed to atmospheric oxygen and water and can produce ARD. While oxygen can enter the mine working through such openings as the adit and fracture zones, a reinforced concrete bulkhead 29 is constructed to prevent atmospheric access to the mine. One or more known ABS drainage pipes are installed through the bulkhead to allow the mine water to continue to drain from the mine. The inlets of the drain pipes are designed to remain submerged in order to avoid a direct connection between the mine and the outside atmosphere. In addition to the ABS drainage pipes, two other pipes also extend through the bulkhead 29. One pipe delivers NGRGM produced by a nitrogen generator 10, while the other pipe is equipped with a check valve 25 and allows excess gas from the mine to be vented to the outside atmosphere. To prevent any oxygen ingress by air convection, any openings in the mine are partially or completely backfilled or otherwise blocked. This would ensure that any influx of oxygen into the mine occurs only by diffusion.

Figure 7:
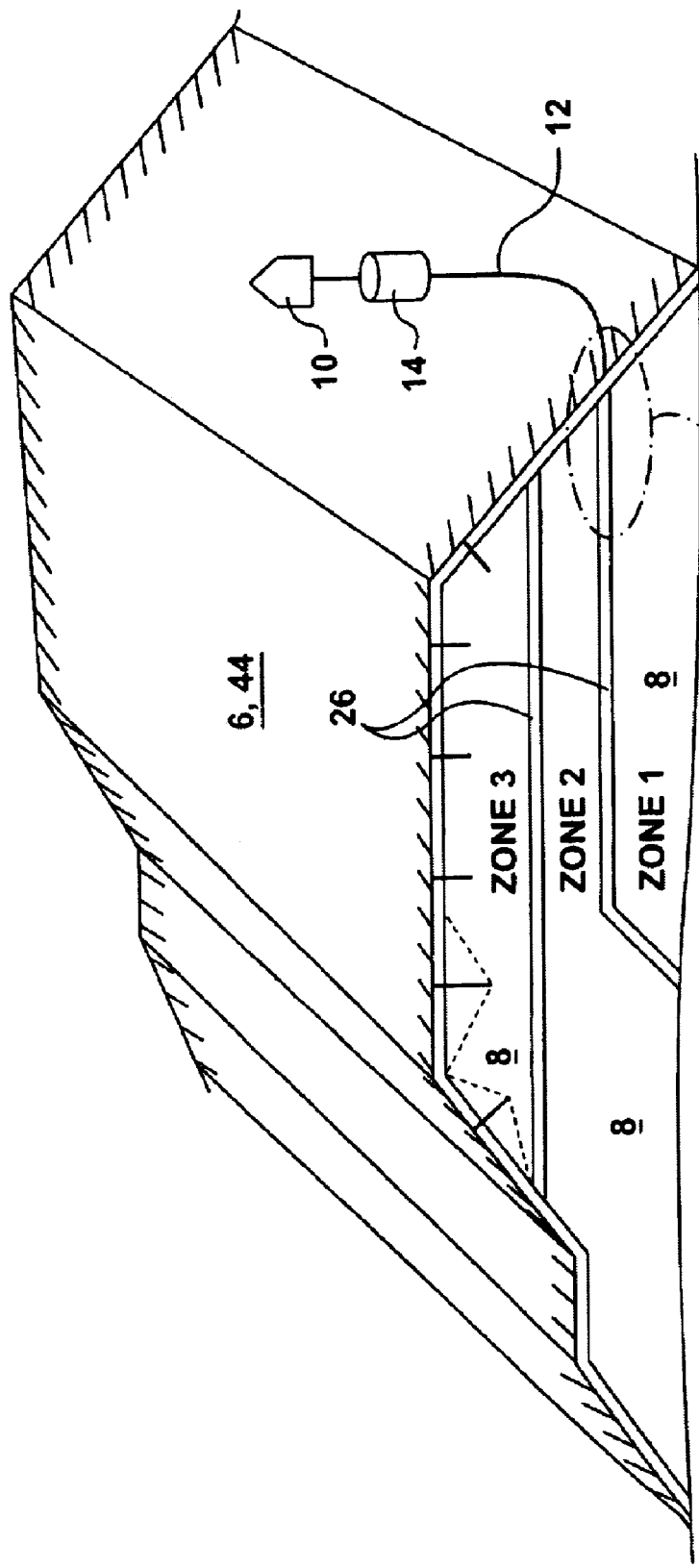
FIG. 7 is a cross-section illustrating the general process whereby NGRGM is injected into the internal zones of rock dump or other zone that has the potential to generate ARD.
Figure 8:
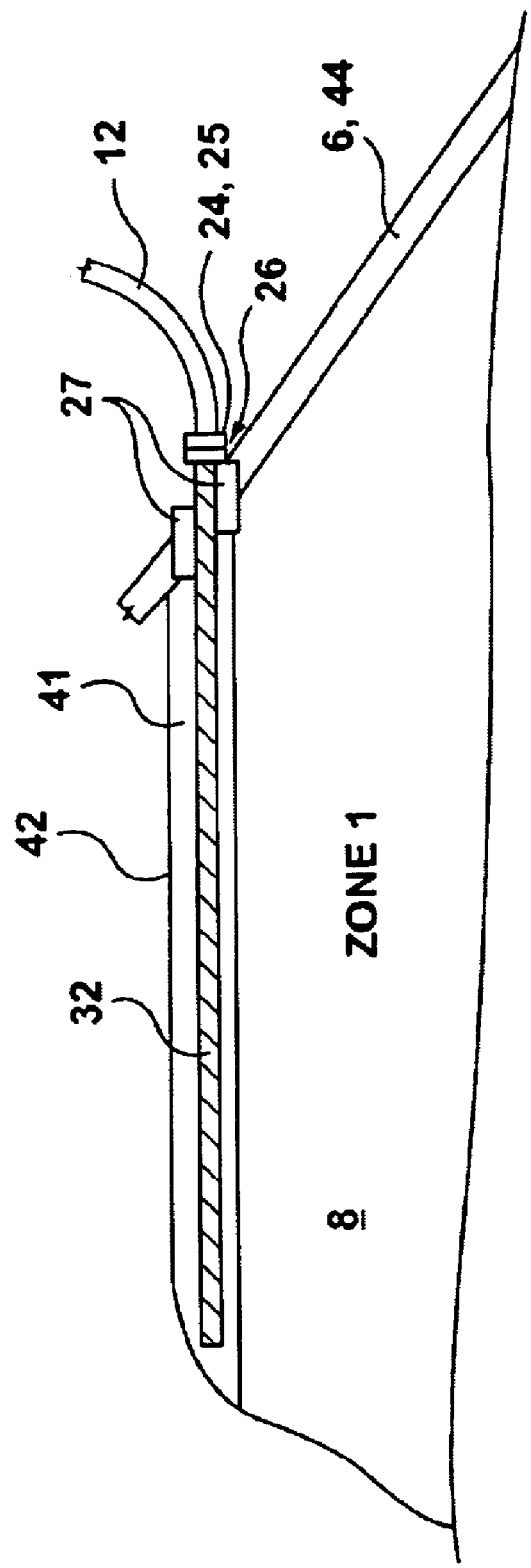
FIG. 8 is a detailed cross-section illustrating the placement of an NGRGM injection pipe in Zone 1 of the sulphidic waste pile, or other zone which has the potential to generate ARD.

Unlike the previously discussed embodiments which address the problem of ARD at existing rock dumps or inactive mine workings, yet another embodiment of the invention addresses the problem of ARD during the development of a rock dump or other ARD-generating source. The main benefit of implementing preventative measures against ARD is that the dump may be better able to withstand the effects of barometric pumping due to the presence of barriers to gas flow within the dump, and increases in the lengths of some diffusion pathways. Referring to FIG. 7, where the rock dump is being progressively constructed, two or more interstitial zones are created which are intended to be injected by NGRGM. By creating a series of internal zones, the physical boundaries between them manipulate the diffusion of gas between the zones and the atmosphere surrounding the dump. FIG. 8 illustrates one approach in which three zones are constructed within a dump. In Zone 1, NGRGM is injected into horizontal pipes laid on and encapsulated in a clean crushed stone on the top of Zone 1. The NGRGM injection pipe is diagonally slotted over the length of the pipe to be located within the rock dump and beneath the dry cover. The final slope section of Zone 1 is covered, first with a soil cover and then with plastic sheeting. Zone 2 is then created above Zone 1, also in a similar fashion as Zone 1. The NGRGM injection assemblies discussed above in an earlier embodiment are also used to inject NGRGM into the newly constructed rock dump.

EXAMPLES IN OPERATION

The following examples illustrate the present invention in operation.

Example No. 1

(FIG. 1)

In this example, a mine waste rock dump has been constructed and filled to its capacity, and its slopes have been re-graded to 3H:1V for long-term physical stability purposes.

At the outset, there is likely to be a reasonable amount of information on the rock pile and available from mines and geology plans and records including drill core/cuttings logs, assay results, and geological sections and plans. Mine production records can provide useful information on when the dump was active, and on how it was constructed. From this basic database, information and data can be collected in regard to the waste rock types, mineralogy and quantities.

Additional information can be obtained by geological visual inspections and sampling of the waste rock dump, and sampling of seepage quality. At sites, where acid generation has commenced, acid generation may be evident by acidic seepage or the onset of increased sulphate and dissolved metal concentrations in the seepage from the dump. The rock types and quantities thereof that compose the dump can be estimated based on surface inspection. In cases where historical records are sparse and/or provide little in the way of relevant information, there may be a need to excavate into the dump, or to drill holes, to collect rock samples. The sampling locations would be carefully noted, and the samples submitted for acid: base accounting testing, and dynamic testing (if appropriate) as determined through the use of established testing protocols.

The physical characteristics of the waste rock are also of interest—these include an assessment of the degree to which the minerals may have weathered, the rock particle sizes and size distribution, general characteristics of the dump (i.e. degree of compaction, mineral exposure, original slope angle, etc).

As an example, consider a waste rock dump that has a volume of 18 million cu.ft. At 18 cu.ft./t of broken rock, the dump would be expected to contain in the order of 1 million tons of broken rock. At a density of 12 cu.ft./ton of solid rock, the void space inside the rock dump would be expected to be the order 6 million cu.ft. Survey plans would be used to determine the surface area of the rock dump assumed to be 600,000 sq.ft. (56,000 m$^2$) in this example.

The atmospheric oxygen flux can be calculated based on initial estimates of the sulphide content and exposure. This information along with meteorological data would be used to assess the performance of various covers using established procedures and computer codes. If it is assumed that the atmospheric oxygen flux through the cover will be 30 moles $O_2/m^2/yr$, the initial NGRGM feed rate can be estimated by multiplying the oxygen rate by a factor of 5, to yield an initial NGRGM injection rate of some 8,500,000 moles $N_2$/yr or 190 million liters/year—about 360 l/min (13 cfm) at STP. The control program is adapted to actuate the delivery system 11 to consistently deliver this range of NGRGM. Based on the approach depicted in FIG. 1, about 250 NGRGM injection holes could be required.

In this case, NGRGM injection could be carried out on a near-continuous basis for up to a year. During this time, the microprocessor 20 controls the nitrogen generator 10, monitors the performance of the system, the NGRGM injection process, and the performance of the NGRGM injection system as a whole. Inputs to the microprocessor 20 include signals from sensors 22 that measure oxygen, nitrogen, barometric pressure and temperature in the interior atmosphere of the rock dump; external atmospheric temperature and barometric station pressure; and inputs such periodic field measurements of the water content of the dry cover. This information would be used to monitor the process, and determine by way of operation of the control program of the present invention, the need to start/stop, reduce/increase the rate of NGRGM production and release to the injection points in the dump. Data will be used to form a database that will be used to calculate key performance indicators for the system, and identify performance trends. At some sites, it may be preferable to automate the process to allow for remote monitoring and operation of the NGRGM generation and injection system. This is achieved in a manner known to those skilled in the art, by operation of the control program of the present invention described above.

Therefore, the control program of the present invention provides means for:
  Increasing nitrogen generation: examples include to overcoming NGRGM losses through the cover from a prolonged drop in the external barometric pressure, or significant reduction in the moisture content (degree of saturation) of the dry cover.
  Decreasing nitrogen generation: examples include reduce demand due to lower temperatures, snow cover, high degree of moisture saturation in the dry cover.

Once the internal atmosphere of the dump approaches a NGRGM, it may be possible to reduce the rate of NGRGM injection. At a long term application rate to double the calculated oxygen diffusion rate, the NGRGM would produce and inject NGRGM at a rate of about 5 cfm STP. This may be accomplished using the original NGRGM injection system and potentially a smaller capacity NGRGM generator.

Example Application No. 2

(FIG. 7 with Horizontal Pipes)

In this example, a mine waste rock dump is constructed in stages, where actions are required to mitigate the opportunity for acid generation at each stage. As a general rule, it is preferable to prevent the generation of ARD acid when possible to do so.

This approach is generally suitable for sulphidic waste rock dumps. Dumps containing highly reactive wastes may benefit additionally from this approach. Reactive wastes are those that as a result of their physical and chemical properties are prone to readily oxidize and produce ARD.

In this example, Zone 1 of the dump represents the first lift or first part of the dump. The approach in this case involves the installation of horizontal NGRGM injection pipes across the top surface of Zone 1. The rows of slotted distribution pipes 32 are surrounded by crushed rock (gravel) with the slotted pipe rows laid parallel and generally no more than 40 pipe diameters apart (depending on the site conditions). The slotted pipes are connected to headers that are fed from the NGRGM receiver and/or nitrogen generator. Each horizontal pipe is equipped with a check valve and shut-off/isolation valve. The surfaces of Zone 1 that are expected to remain exposed after the construction of the Zone 2 lift are covered with a dry cover. The other surfaces of Zone 1 are covered with a plastic membrane or geotextile to provide a convection barrier.

NGRGM injection into Zone 1 can commence with the start of Zone 2 development. The rate of NGRGM injection is designed to inhibit ARD generation within Zone 1.

Once Zone 2 is completed, the process is repeated and NGRGM is injected into both Zones 1 and 2 while Zone 3 is constructed. The NGRGM injection process for Zone 3 is similar to that described in the previous example.

The data requirements for this example are similar to those in the previous example.

The control program of the present invention in relation to this particular embodiment delivers control messages to individual valves within a pile to assist in directing the flow NGRGM to the various zones.

If Zone 1 occupied a volume of 1million cu.ft., it could contain about 55,000 tons of broken rock, with about 330,000 cu.ft. of void space. As sulphide oxidation would be expected to significantly deplete the oxygen level in the dump, a low rate of NGRGM injection would be helpful in maintaining NGRGM conditions in Zone 1. As oxygen consumption represents a near 20% loss of gas volume, assume that a NGRGM injection of 5 times that value (essentially replacing the gases in the rock void spaces once per year) would provide a NGRGM atmosphere within Zone 1. In this case, the rate of NGRGM generation would be about 1 cfm STP.

The use of zones within the rock dump provides additional advantages when the dump is completed. A key benefit is the ability of the dump to withstand the effects of barometric pressure changes, as gas movement between zones inside the dump, and between the zones and the external atmosphere, would be diffusion-controlled.

Example No. 3

(FIGS. 5 & 6)

In this example, an engineered cover is constructed with a slotted pipe disposed horizontally vis-à-vis the top surface of the dump, in the capillary break layer. This layer is by its nature constructed of coarse material, and as such would serve as a good conduit for NGRGM dispersion.

NGRGM would be injected into the capillary break layer at a rate that would allow a range of NGRGM to be maintained in the pore spaces in the capillary break layer. This would in turn provide a further barrier to the diffusion of oxygen from the atmosphere to the sulphidic wastes located beneath the cover.

The rate of NGRGM injection would be calculated based on oxygen diffusion measurements or estimates, with the rate of NGRGM initially ranging from 2 to 5 times the oxygen diffusion rate. Pressure measurements taken inside the capillary layer and in the external atmosphere will be used to ensure that the gas pressure in the capillary layer cannot damage physical integrity of the dry cover.

The rate of NGRGM injection could be decreased when field assessments (including water content measurements using nuclear density gauges and/or laboratory methods) show that the moisture retaining layer of the cover is sufficiently saturated. Conversely, the rate of NGRGM may be increased when the moisture layer is insufficiently saturated to effectively limit the rate of oxygen diffusion.

The NGRGM system is controlled via a microprocessor as was the case in the first example.

Example No. 4

Use of the "Rock Halo"

In this example, the surface of a completed rock dump is covered with a plastic membrane which is in turn covered by a layer of non-acid generating broken rock. A NGRGM injection pipe system of the present invention is placed in this rock layer. The rock layer is then covered by a dry cover. NGRGM is injected into the rock layer that is sandwiched between the dump and the dry cover.

The key advantage is the reduced amount of rock void spaces and IGM (in this case NGRGM) injection requirements.

If the approach described in this example was used instead of that in example No. 1, There would be no need to drill holes.

Injection pipe installation would be simpler.

The NGRGM mixture requirement would be based on a void volume of some 1.6 million cu.ft. assuming an 8 foot thick rock layer. This is a considerable improvement over the 6 million cu.ft. of void space requiring NGRGM in example No. 1.

Other Potential Applications:

Potential applications for the present invention also exist in the management of covered municipal solid (non-hazardous) wastes, and covered hazardous materials. As an example, a potential application is to prevent and to control the migration of oxygen from the atmosphere into covered solid non-hazardous waste and/or covered hazardous waste in order to prevent and/or to control the decomposition of the wastes and undesirable air emissions and/or contaminated seepage. In this regard, it may be beneficial to create and/or maintain inert, non-reactive and oxygen-deficient internal gas mixtures within covers/permeable shells over solid (non-hazardous) waste or covered hazardous waste, and/or within the void spaces in these wastes.

Another potential application of the present invention is the application of IGM to municipal solid waste landfills to maintain generally inert gas conditions for specified lengths of time, and IGM application thereafter used to control oxygen influx so that the rate of waste composition and landfill gas generation is controlled in order to improve the yield and/or recovery of landfill gases collected and used to generate electrical power.

Another potential application is the application of IGM to control fires/smoldering occurrences in coal seams, coal spoils, coal mine refuse dumps that have covers over their exposed surfaces, and within inactive/sealed underground mine workings.

Another potential application of the present invention is the application of IGM to maintain or to reduce the internal temperatures of covered non-hazardous and hazardous wastes in order to cool the wastes and encourage cool, inert gas conditions to mitigate adverse environmental impacts to local air quality, adjacent land, groundwater, and/or receiving surface water quality.

What is claimed is:

1. A method of preventing and controlling sulfide mineral oxidation and generation of acid rock drainage in a mass of sulfidic waste that is provided with a cover, the method comprising:
   (a) determining, based on one or more site conditions affecting the sulfide mineral oxidation and generation of acid rock drainage for the mass of sulfidic waste, a quantity of oxygen deficient/non-reactive gas mixture which when applied under the cover is effective to create a pressure differential between the inside of the mass of sulfidic waste and the open atmosphere outside and adjacent to the mass of sulfidic waste such that the oxygen gas concentration inside the mass of sulfidic waste is substantially equal to, or less than, the atmospheric oxygen gas concentration outside and adjacent to the mass of sulfidic waste; and
   (b) applying under the cover said quantity of oxygen deficient/non-reactive gas mixture, such that the quantity of oxygen deficient/non-reactive gas mixture applied in an area adjacent to a top surface of the mass of sulfide waste renders the cover operable as an atmospheric oxygen barrier.

2. The method claimed in claim 1, whereby the application of the oxygen deficient/non-reactive gas compensates for previous partial pressure loss of oxygen due to oxygen consumption within the mass of sulfidic waste.

3. The method as claimed in claim 2, whereby the application of the oxygen-deficient/non-reactive gas mixture discourages the entry of atmospheric oxygen into the mass of sulfidic waste.

4. The method as claimed in claim 1, further comprising the step of analyzing the site conditions to determine the quantity of oxygen deficient/non-reactive gas mixture sufficient to create the pressure differential between the inside of the mass of sulfidic waste and the open atmosphere outside and adjacent to the mass of sulfidic waste.

5. The method as claimed in claim 1, whereby the oxygen deficient/non-reactive gas mixture is applied on a continuous basis.

6. The method as claimed in claim 1, whereby the oxygen deficient/non-reactive gas mixture is applied on an intermittent basis.

7. The method as claimed in claim 4, further comprising the step of installing one or more sensor means for sensing the conditions affecting acid rock drainage of the mass of sulfidic waste.

8. The method as claimed in claim 1, whereby the oxygen deficient/non-reactive gas consists of a nitrogen rich gaseous mixture.

9. The method as claimed in claim 4, whereby the method consists of collecting data regarding the site conditions, such site conditions including one or more of the following:
   (a) The mineralogy of the mass of sulfidic waste;
   (b) The state of oxidation of the mass of sulfidic waste;
   (c) The seepage quality of the mass of sulfidic waste; and
   (d) The interior temperature of the mass of sulfidic waste.

10. A method or preventing and controlling sulfide mineral oxidation and generation of acid rock drainage in a mass of sulfidic waste, the method comprising:
   (a) constructing a cover over the mass of sulfidic waste that includes at least one distribution apparatus for distributing an oxygen deficient/non-reactive gas mixture substantially throughout the inside the mass of sulfidic waste;
   (b) determining based on one or more site conditions affecting the sulfide mineral oxidation and generation of acid rock drainage for the mass of sulfidic waste, a quantity of oxygen deficient/non-reactive gas mixture which when applied under the cover is effective to create a pressure differential between the inside of the mass of sulfidic waste and the open atmosphere outside and adjacent to the mass of sulfidic waste such that the oxygen gas concentration inside the mass of sulfidic waste is substantially equal to, or less than, the atmospheric oxygen gas concentration outside and adjacent to the mass of sulfidic waste; and (c) applying under the cover said quantify of oxygen deficient/non-reactive gas mixture, such that the quantity of oxygen deficient/non-reactive gas mixture applied in an area of the mass of sulfidic waste adjacent to a top surface of the mass of sulfidic waste renders the cover operable as an atmospheric oxygen barrier.

11. The method claimed in claim 1, whereby the oxygen deficient/non-reactive gas is chilled before application thereof within the mass of sulfidic waste.

12. A system for preventing and controlling sulfide mineral oxidation and generation of acid rock drainage in a mass of sulfidic waste comprising:
(a) a cover;
(b) a gas dispensing apparatus for dispensing an oxygen deficient/non-reactive gas mixture; and
(c) a distribution system that is operable to apply and maintain a quantity of oxygen deficient/non-reactive gas mixture which when applied under the cover is determined (based on one or more site conditions affecting the sulfide mineral oxidation and generation of acid rock drainage for the mass of sulfidic waste) to be effective to create a pressure differential between the inside of the mass of sulfidic waste and the open atmosphere outside and adjacent to the mass of sulfidic waste, such that the oxygen gas concentration inside the mass of sulfidic waste is substantially equal to, or less than, the atmospheric oxygen gas concentration outside and adjacent to the mass of sulfidic waste;
wherein the distribution system, by operation of said effective amount of oxygen deficient/non-reactive gas mixture applied in the area adjacent to a too surface of the mass of sulfidic waste, renders the cover operable as an atmospheric oxygen barrier.

13. A system as claimed in claim 12, wherein the cover is a covered porous layer of material.

14. The system as claimed in claim 12, flintier comprising a sensing means linked to the mass of sulfidic waste for obtaining sensor data regarding the site conditions.

15. The system as claimed in claim 12, wherein the distribution system includes a pipeline, wherein the pipeline connects with a plurality of entry points disposed substantially throughout a top surface of the cover, and wherein the pipeline further connects to the gas dispensing apparatus.

16. The system as claimed in claim 15, wherein the distribution system includes a plurality of injection assemblies located at the plurality of entry points, wherein the injection assemblies are disposed inside the mass of sulfidic waste such that they are adapted to distribute the oxygen deficient/non-reactive gas mixture substantially horizontally within the mass or sulfidic waste.

17. The system as claimed in claim 16, wherein the system further comprises a controller, and the injection assemblies include a valve means linked to the controller, whereby the controller controls the operation of the valve means so as to control the distribution of the oxygen deficient/non-reactive gas mixture within the mass of sulfidic waste.

18. The system as claimed in claim 17, wherein the injection assemblies are anchored within holes disposed in the entry points.

19. The system as claimed in claim 14, wherein the sensing means is adapted to monitor the pressure of the oxygen deficient/non-reactive gas mixture within the distribution system, the concentration of oxygen deficient/non-reactive gas within the mass of sulfidic waste, the atmospheric barometric pressure, and the internal gas, external and internal mass of sulfidic waste temperatures.

20. A computer program product, executable on a computer linked to a distribution system for distributing an oxygen deficient)non-reactive gas mixture inside a mass of sulfidic waste, and a sensing means for obtaining sensor data regarding conditions affecting acid rock drainage in the mass of sulfidic waste, wherein the computer program product is adapted to instruct the computer to:
(a) Monitor the acid rock drainage conditions of the mass of sulfidic waste via the sensing means; and
(b) Based on the monitored acid rock drainage conditions of the mass of sulfidic waste, activating the distribution system to apply substantially throughout the inside of the mass of sulfidic waste an oxygen deficient/non-reactive gas mixture in a quantity sufficient to create a pressure differential within the mass of sulfidic waste.

21. A computer program product as claimed in claim 20, the computer program product being further adapted to instruct the computer to apply the oxygen deficient/non-reactive gas mixture continuously or intermittently to maintain the pressure differential within the mass of sulfidic waste.

22. The method as claimed in claim 1, comprising the further step of adjusting said quantity of oxygen deficient/non-reactive gas mixture to changes of barometric pressure of the open atmosphere outside and adjacent to the mass of sulfidic waste.

23. The method as claimed in claim 10, comprising the further step of adjusting said quantity of oxygen deficient/non-reactive gas mixture to changes of barometric pressure of the open atmosphere outside and adjacent to the mass of sulfidic waste.

24. A method of preventing and controlling sulfidic mineral oxidation and generation of acid rock drainage in a mass of sulfidic waste that is provided with a cover, the method comprising:
(a) analyzing the mass of sulfidic waste so as to determine, based on one or more site conditions affecting the sulfide mineral oxidation and generation of acid rock drainage for the mass of sulfidic waste, a quantity of oxygen deficient/non-reactive gas mixture which when applied under the cover is effective to create a pressure differential between the inside of the mass of sulfidic waste and the open atmosphere outside and adjacent to the mass of sulfidic waste such that the oxygen gas concentration inside the mass of sulfidic waste is substantially equal to, or less than, the atmospheric oxygen gas concentration outside and adjacent to the mass of sulfidic waste; and
(b) applying under the cover said quantity of oxygen deficient/non-reactive gas mixture substantially throughout the mass of sulfidic such that the quantity of oxygen deficient/non-reactive gas mixture applied in the area adjacent to a top surface of the mass or sulfidic waste renders the cover operable as an atmospheric oxygen barrier, and (c) adjusting said quantity of oxygen deficient/non-reactive gas mixture to changes of barometric pressure of the open atmosphere outside and adjacent to the mass of sulfidic waste.

25. A system for preventing and controlling sulfide mineral oxidation and generation of acid rock drainage in a mass of sulfidic waste comprising:
(a) A cover;
(b) A gas dispensing apparatus for dispensing an oxygen deficient/non-reactive gas mixture; and
(c) A distribution system for applying and maintaining the oxygen deficient/non-reactive gas mixture substantially throughout the inside of the mass or sulfidic waste, in a quantity sufficient to create a pressure differential between the inside of the mass of sulfidic waste and the open atmosphere outside and adjacent to the mass of sulfidic waste, such that the oxygen gas concentration inside the mass of sulfidic waste is substantially equal to, or less than, the atmospheric oxygen gas concentration outside and adjacent to the mass of sulfidic waste, wherein the distribution system includes a pipeline, wherein the pipeline connects with a plurality of entry points disposed substantially throughout a top surface of the cover, and wherein the pipeline further connects to the gas dispensing apparatus.

26. The system as claimed in claim 25, further comprising a sensing means linked to the mass of sulfidic waste for obtaining sensor data regarding the site conditions.

27. The system as claimed in claim 25, wherein the distribution system includes a pipeline, wherein the pipeline connects with a plurality of entry points disposed substantially throughout a top surface of the cover, and wherein the pipeline further connects to the gas dispensing apparatus.

28. The system as claimed in claim 27, wherein the distribution system includes a plurality of injection assemblies located at the plurality of entry points, wherein the injection assemblies are disposed inside the mass of sulfidic waste such that they are adapted to distribute the oxygen deficient/non-reactive gas mixture substantially horizontally within the mass of sulfidic waste.

29. The system as claimed in claim 28, wherein the system further comprises a controller, and the injection assemblies include a valve means linked to the controller, whereby the controller controls the operation of the valve means so as to control the distribution of the oxygen deficient/non-reactive gas mixture with in the mass of sulfidic waste.

30. The system as claimed in claim 29, wherein the injection assemblies are anchored within holes disposed in the entry points.

31. The system as claimed in claim 26, wherein the sensing means is adapted to monitor the pressure of the oxygen deficient/non-reactive gas mixture within the distribution system, the concentration of oxygen deficient/non-reactive gas within the mass of sulfidic waste, the atmospheric barometric pressure, and the internal gas, external and internal mass of sulfidic waste temperatures.

* * * * *